United States Patent [19]

Cole, Jr. et al.

[11] Patent Number: 5,069,723

[45] Date of Patent: * Dec. 3, 1991

[54] METHOD FOR CONTROLLING DUST IN GRAIN

[75] Inventors: Howard W. Cole, Jr., First and Main Sts., Burgin, Ky. 40310; Stephen E. Taylor, Bardstown, Ky.

[73] Assignee: Howard W. Cole, Jr., Burgin, Ky.

[*] Notice: The portion of the term of this patent subsequent to Aug. 13, 2008 has been disclaimed.

[21] Appl. No.: 433,768

[22] Filed: Nov. 9, 1989

Related U.S. Application Data

[63] Continuation-in-part of Ser. No. 333,422, Apr. 4, 1989.

[51] Int. Cl.$^5$ .................................................. B08B 9/20
[52] U.S. Cl. .................................... 134/25.1; 134/34; 134/42; 426/568; 426/571; 427/373
[58] Field of Search .................. 252/88, 307; 426/568, 426/571; 427/373; 261/DIG. 261; 134/18, 32, 25.1, 25.4, 34; 99/516, 474

[56] References Cited

U.S. PATENT DOCUMENTS

| | | | |
|---|---|---|---|
| 3,695,165 | 10/1972 | Sienkiewicz et al. | 99/471 |
| 3,811,660 | 5/1974 | Cole, Jr. | 261/DIG. 26 |
| 3,814,816 | 6/1974 | Gunther | 426/46 |
| 4,207,202 | 6/1980 | Cole, Jr. | 261/DIG. 26 |
| 4,370,267 | 1/1983 | Lehnhardt | 426/26 |
| 4,390,450 | 6/1983 | Gibson | 252/307 |
| 4,400,220 | 8/1983 | Cole, Jr. | 261/DIG. 26 |
| 4,409,248 | 10/1983 | Lehnhardt | 426/26 |
| 4,632,903 | 12/1986 | Boyce | 435/69 |

*Primary Examiner*—Curtis R. Davis
*Attorney, Agent, or Firm*—Middleton & Reutlinger

[57] ABSTRACT

A method for suppressing dust in grain handling includes applying an edible foam so that it penetrates the grain to reach the dust particles.

7 Claims, 3 Drawing Sheets

METHOD FOR CONTROLLING DUST IN GRAIN

BACKGROUND OF THE INVENTION

This application is a continuation-in-part of U.S. Pat. application Ser. No. 07/333,422, filed Apr. 4, 1989.

The problem of grain-storage explosions has been very serious for many years. Grain dust is released from the grain while it is being transported and handled. The dust is derived from the abrasion of the kernels agitating one another and from dust and extraneous materials which are included with the grain during harvest. When the dust is confined in an enclosed air pocket, as in a grain storage elevator, it can ignite, causing an explosion. Such explosions have resulted in substantial loss of human life and of property, and, until now, no effective solution has been found to the problem.

Fires and explosions in grain handling equipment occur when oxygen from the air, grain dust, and a spark are combined. To eliminate the fires and explosions, at least one of those three elements must be removed.

Safety rules have been established to prevent smoking around grain handling equipment and to take other precautions to prevent the spark that could start the fire or explosion. However, it is almost impossible to guarantee that there will never be a spark in the area. A hot bearing in a transfer conveyor may provide an ignition source. Misalignment of the conveyor belt, interference of parts, or contact of parts with the legs of bucket elevators are common ignition sources for grain elevator fires and explosions. Therefore, we cannot prevent the fires and explosions by preventing the ignition source.

It would be very impractical to try to handle grain in an oxygen-free environment because it would require sealed containers and inert atmospheres, and the grain could not come in contact with the air. Since it is not practical to eliminate the ignition source or the oxygen, the most effective way to greatly reduce the risk of fire or explosion is to eliminate the fuel—the dust.

Some types of vacuums and filters have been used in the past to reduce the concentration of grain dust, but they are very ineffective at reducing the dust. Each trip through a vacuum device reduces dust by about 5%, so it would take many trips through a vacuum device just to cut the amount of dust by half. Oil treatment systems have been used, but there are serious concerns about the effect of the oil on milling qualities and grain quality.

There have been effective methods for controlling dust in other industries, particularly the coal industry, for about twenty years, but these methods have not been used to suppress dust in grain or foods. In the coal industry, a very small bubble foam has been applied to the coal. The small bubbles burst when they contact the small dust particles thereby coating the dust particles, which then apparently agglomerate with other dust particles until they are heavy enough to fall out of the air. However, the materials used to make these small bubble foams are not edible and therefore cannot be used with grains or other food products Even if an edible small bubble foam existed which had the proper volume, bubble size, quality, texture and endurance, it would be much more difficult to apply the foam to a grain than to coal. With coal, the majority of the tonnage is in fairly large chunks, so it is relatively easy to spray around and between the few large chunks to get to the dust particles. However, with grain, the product itself is relatively small, and it is impossible to spray a foam around and between the thousands of particles in a stream of grain to reach the dust particles. Thus, even if a proper edible foam had existed prior to the present invention, the problem of grain dust explosions would not have been solved.

Despite numerous government and other studies recognizing the severity of the problem and searching for a solution to it, the pressing problem of dust in grain handling continues, and the loss of property and life from grain explosions continues.

SUMMARY OF THE INVENTION

The inventors of the present invention conducted their own research to try to solve the problem of dust in grain handling. First, they did extensive work to develop an edible surfactant that could make a foam having the right bubble size, volume, texture and endurance to be useful in controlling dust. Many surfactant materials broke down under the high pressures required to produce small bubble foam, and many collapsed quickly like the froth on beer. It was a very difficult task to find edible materials that could produce the proper foam.

Next, they worked to develop methods for applying the foam to the grain in such a manner that the foam would get through the grain particles to contact the dust particles. Only after this extensive development work was a solution to the problem reached.

The present invention has many attributes:

The present invention solves the problem of dust in grain handling.

The present invention solves the problems of fires and explosions caused by grain dust.

The present invention provides a method for producing a small bubble foam of edible materials and for applying that foam so that it comes in contact with the grain dust particles to suppress grain dust.

The present invention will protect life and property in the grain handling industry to an extent never before possible.

DESCRIPTION OF THE PREFERRED EMBODIMENTS

Figure 2:
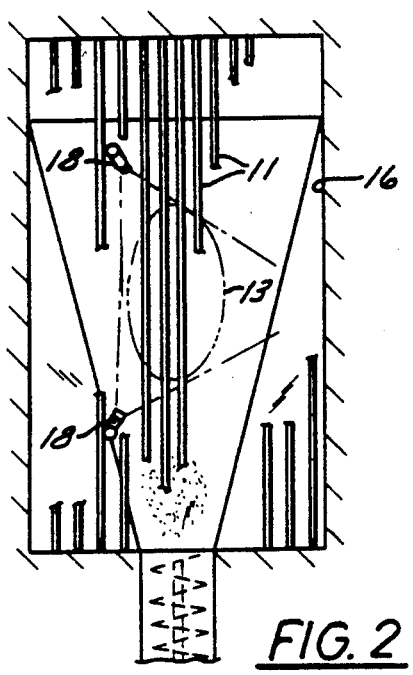
FIG. 2 is a view taken along the section 2—2 of FIG. 1.

In order to produce an edible foam having the necessary characteristics for controlling dust, a foam generator of the type described in U.S. Pat. Nos. 3,811,660; 4,400,220 or 4,207,202 is used. Those patents are hereby incorporated by reference. This foam generator combines air, water, and surfactant and forces the mixture through tortuous passages to form a small bubble foam.

As was explained earlier, this type of foam generator could not be used before to suppress dust in grain, because the surfactants needed to produce the proper foam were not edible and therefore could not be used with food products. Also, there lo was no way to get the foam to the dust particles in grains, because the many particles of grain blocked the flow of the foam. However, the present invention provides an edible surfactant which produces a firm, small bubble foam and provides a method for applying the foam to the grain.

The foam needed for this purpose must have bubbles in the range of 50-200 microns in diameter with an of 20-40. The expansion factor is the volume of foam divided by the volume of water and surfactant used to make the foam. The foam also cannot have a high ratio of surfactant to water, or it will be too expensive to produce. The foam also must keep its structure for at least the time it takes for the foam to travel from the nozzle or distribution pipe to the grain, which may be as long as several minutes. The foam must maintain its structure for at least two minutes to be useful.

The surfactant that has been used successfully is a soybean protein purchased from the Gunther protein division of A.E. Staley Co. and sold under the trademark of VersaWhip 500. Originally, the inventors purchased the Versa Whip 500 powder, added hot water to put it into solution, and then used it as the surfactant, combining it with air and water in the machine described in U.S. Pat. No. 4,207,202. Later, they went to the manufactures of the VersaWhip 500 product and bought it in its liquid form, before it was dried to a powder. It is possible that other protein-based surfactants will also work, although none have been found yet.

The VersaWhip 500 surfactant is a pepsin-modified, soybean-based protein with sodium benzoate added as a preservative. The manufacturer says that its method of production and composition are a trade secret. When it is used in the foam generator described above, it produces a stiff, meringue-type foam with bubbles in the range of 50-200 microns in diameter and an expansion factor of 20-40. The foam holds up for a period of several minutes (well over two minutes). The ratio of surfactant to water is in the range of two to four percent.

In order to solve the dust problem in grain handling, this foam must get into contact with the dust particles. Since there are many grain particles around the dust particles, the foam cannot be readily applied by just spraying it on the product. If the foam is sprayed on a stream of grain, it will be stopped by the particles of grain before it gets to the dust inside the stream. If the foam is sprayed at a higher pressure to try to get into the center of the stream of grain, the whole stream of grain may be blown off course by the foam.

Figure 3:
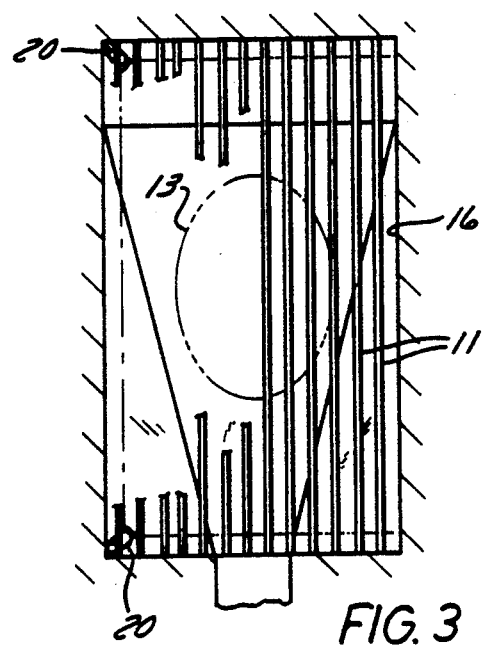
FIG. 3 shows an alternate foam application pattern to that shown in FIG. 2.
Figure 1:
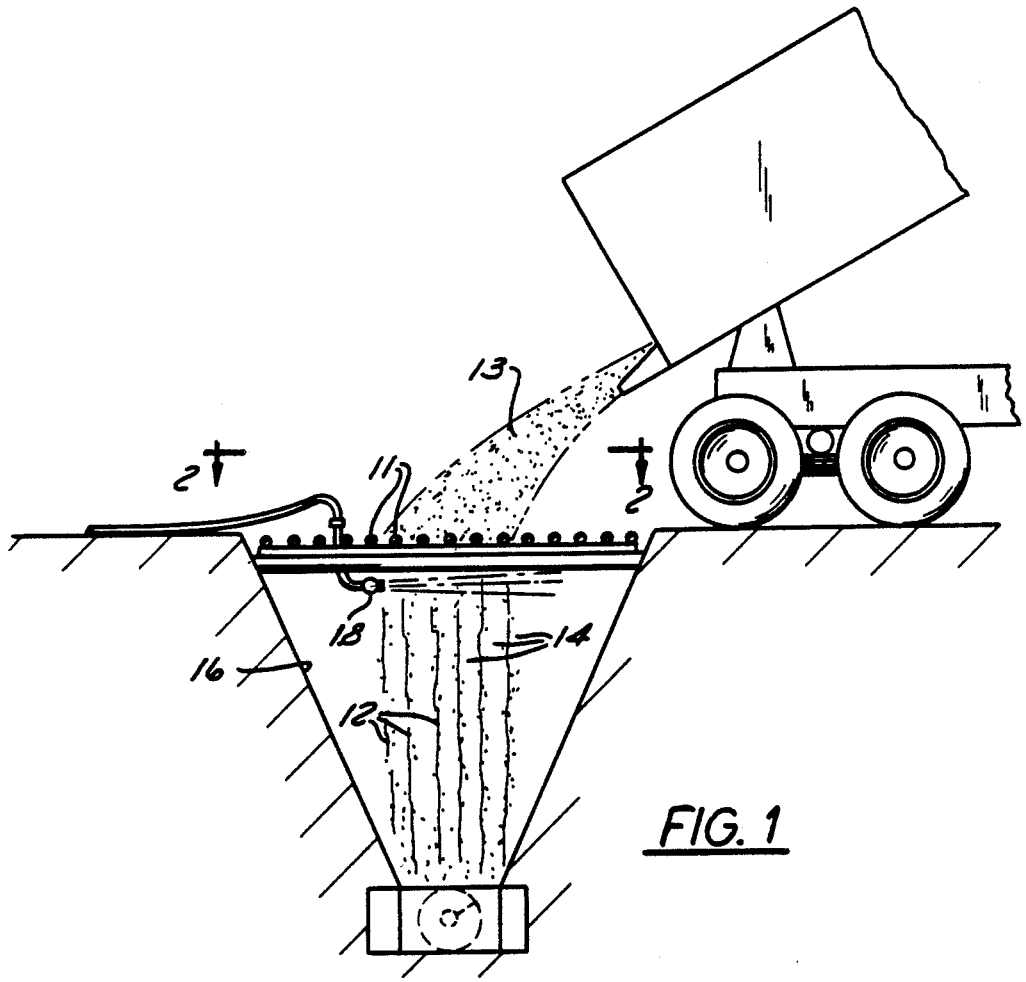
FIG. 1 is a schematic side view showing one method of applying foam to grain.
Figure 4:
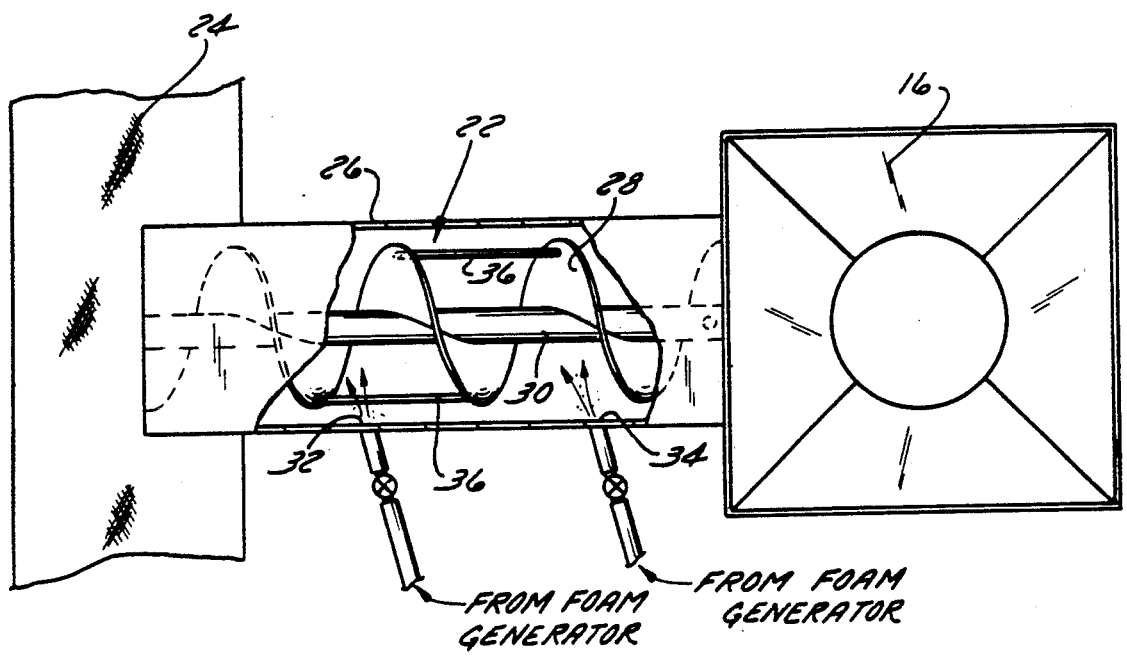
FIG. 4 is a schematic top view partially broken away of a screw conveyor and hopper showing another method for applying foam to the grain.
Figure 5:
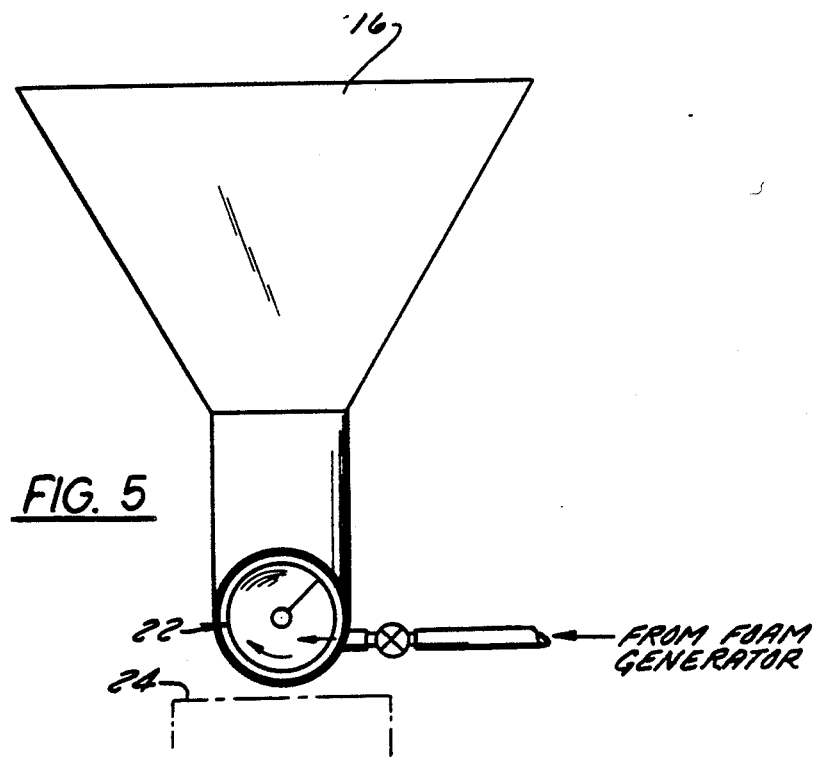
FIG. 5 is a left side view of the screw conveyor and hopper of FIG. 4.
Figure 6:
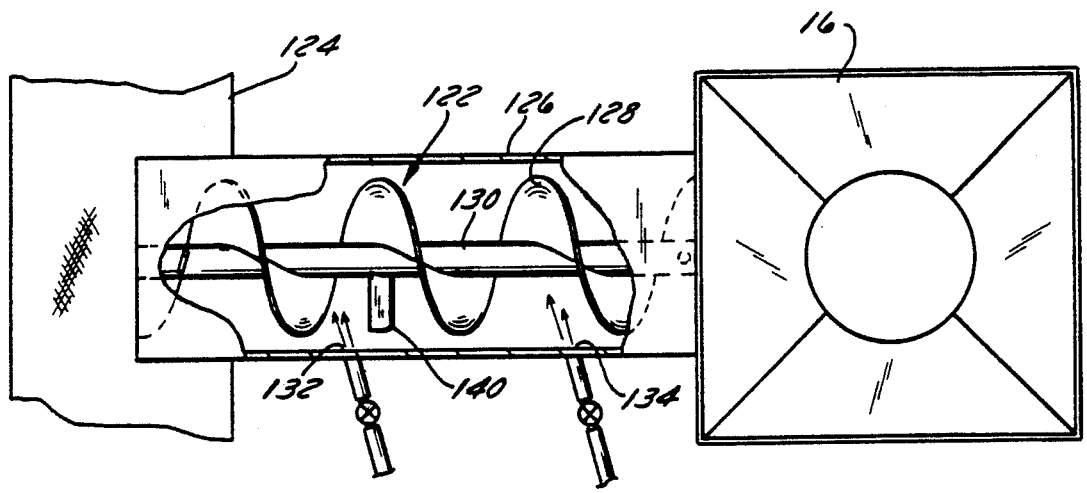
FIG. 6 is a view similar to that of FIG. 4 with the screw conveyor modified.
Figure 7:
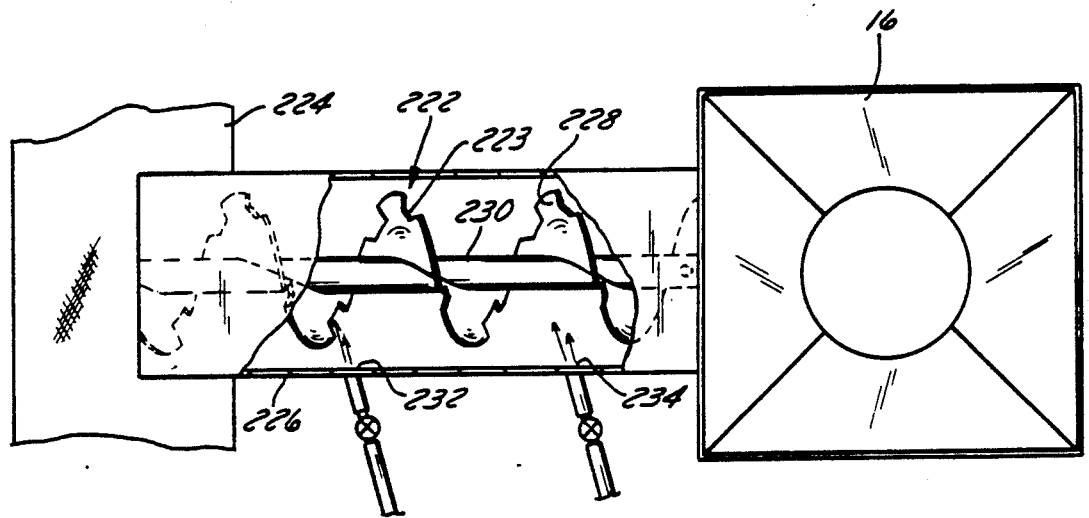
FIG. 7 shows another modification to the screw conveyor.
Figure 8:
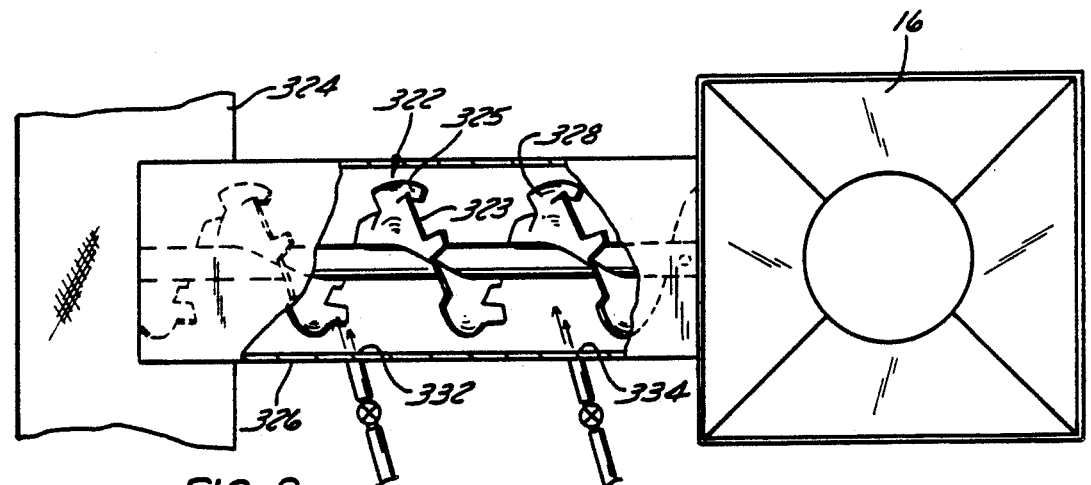
FIG. 8 shows another modification to the screw conveyor.

In order to reach the dust particles, special application methods should be used. One method, as shown in FIGS. 1-3, uses a grating 10 of parallel bars 11 to break up the stream of grain 13 into sheets 12. The spaces 14 between the sheets 12 provide paths for the foam to follow in order to reach into the center of the stream of grain 13 and to contact dust particles throughout the stream of grain 13. This grating 10 is used at the entrance to a hopper 16 but could be used at other points where grain is transferred in the grain-handling system. Also, different types of gratings or baffles could be used to break up the flow of grain and create pathways for the foam to enter.

As is shown in FIG. 2, two 60° nozzles 18 are used to cover the area with foam. Additional nozzles could be included as needed to provide adequate coverage. When the foam penetrates the grain as shown in FIGS. 1 and 2, it contacts the dust particles and causes them to agglomerate to each other or adhere to the heavier grain particles. The particles are thereby retained within the bulk of the grain and do not subsequently become airborne as long as the small amount of moisture added to the grain by the small bubble foam remains present. The fugitive dust particles remain locked with the grain even if the moisture evaporates or is absorbed by the grain as long as the grain is not physically moved or disturbed. If the moisture is removed, the grain may be re-treated with small bubble foam many times without deterioration of the grain.

If the stream of grain 13 is too large to be completely penetrated by the foam, foam can still be applied at the top of the hopper 16 as shown in FIG. 3 (with or without a grating) and can serve as a barrier or shield to prevent dust from being carried up out of the hopper 16 by the air that is displaced from the hopper as the grain 13 enters the hopper. In this case, it is important for the foam to cover the air space around the stream of grain. This is effective to keep grain dust out of the area above the hopper 16, but it does not control the fugitive dust from the grain as penetration of the foam would.

Another way to get the foam to penetrate into the grain is to mix the foam into the grain. FIGS. 4–8 show different embodiments of a screw conveyor 22 which carries the grain from the hopper 16 to a conveyor belt 24. The screw conveyor 22 includes a closed cylindrical shell 26 with a helical blade 28 mounted on a shaft 30 which is driven by some known means (not shown). As the screw conveyor shaft 30 is driven, it carries grain from the bottom of the hopper 16 toward the conveyor belt 24. At the same time, foam from a foam generator as described earlier is injected into the bottom side of the cylindrical shell 26 through openings 32,34.

As the grain is carried by the screw conveyor, it mixes with the foam, permitting the foam bubbles to contact the dust particles. Then, when the grain falls onto the conveyor belt 24, virtually no dust will enter the air.

The helical blade 28 shown in FIG. 2 includes crossbars 36 for about the first ten feet of its length which help cause additional mixing of the foam into the grain. Other modifications to the screw conveyor could also be made to aid in mixing. Some modification are shown in FIGS. 6–8. In referring to the embodiments in FIGS. 6–8, similar numbers correspond to similar components, and the embodiments function similarly to what is shown in FIG. 4, with only the differences being described. FIG. 6 is the preferred embodiment, in which a paddle 140 is welded to the shaft 130 at the hand opposite to the hand of the helical blade 128. These paddles 140 can be attached at various intervals to cause some back-flow of the grain and cause mixing. Paddles 140 could also be added to any of the screw conveyors shown in FIGS. 4, 7 or 8.

FIG. 7 shows a screw conveyor 222 in which notches 23 are cut into the helical blade 228 to promote mixing.

FIG. 8 shows a screw conveyor 322 in which notches 23 are cut into the helical blade 328, and the helical blade is bent to form arms 325 to promote mixing.

Other places in a typical grain handling facility where mixing of foam and grain could be accomplished are tumblers and driers in which the grain is tumbled in a drum with screens in order to screen out various sizes or is tumbled in a drum with air flowing through the drum for drying. In either case, foam could be injected into the drum to mix with the grain and treat the dust particles as the grain is tumbled.

It will be obvious to those skilled in the art that modifications may be made to the embodiments described above without departing from the scope of the present invention.

What is claimed is:

1. A method for suppressing dust in grain transfer systems, comprising:

mixing air, water and an edible surfactant having an expansion factor of between 20–40 together at ambient temperature;

pumping said air, water, and an edible surfactant in a continuous manner under high pressure through a tortuous path in a foaming apparatus, to produce an edible foam capable of retaining its structure as a foam capable of being mixed with particles of grain and the like and having composed of small bubbles of a size distribution in the range of 500–200 microns in diameter;

placing at least one foam injection means at one or more locations within the grain transfer system where dust is likely to be generated;

pumping said edible small bubble foam to said areas of said grain transfer system where dust generation is likely; and spray-injecting said edible small bubble foam into said grain as it is being transferred within said grain transfer system to effect a mixing of said edible small bubble foam with and into the grain to promote contact between said edible small bubble foam and the grain and grain dust particles, whereby said small bubbles of said edible small bubble foam rupture, wetting at least said grain dust particles and promoting adhesion of said grain dust particles to one another and other said grain particles to effect suppression of said grain dust.

2. A method for suppressing dust in grain handling as recited in claim 1, wherein the surfactant is a pepsin-modified, soybean-based protein.

3. A method as recited in claim 1 wherein said grain transfer system includes a screw conveyor and said edible small bubble foam is injected through the bottom of the trough of said screw conveyor and is mixed with the grain by the flights of said screw conveyor as said grain is conveyed therealong.

4. A method as recited in claim 1 wherein said edible small bubble foam is injected into said grain to penetrate the interstices between said grain and grain dust particles.

5. A method as recited in claim 1 wherein said grain transfer system includes a feed hopper having a bottom exit chute to discharge grain therefrom through a grate to a lower point of said grain transfer system and said edible small bubble foam is injected into said grain as it falls through said grate.

6. A method as recited in claim 1 wherein said grain transfer system includes a dryer and said edible small bubble foam is injected into said grain and grain dust particles as they exit from said fryer after being dried.

7. A method as recited in claim 1 wherein said grain transfer system includes a tumbler and said edible small bubble foam is injected into said grain while said grain is within said tumbler.

* * * * *

UNITED STATES PATENT AND TRADEMARK OFFICE
CERTIFICATE OF CORRECTION

PATENT NO. : 5,069,723

DATED : December 3, 1991

INVENTOR(S) : Howard W. Cole, Jr. and Stephen E. Taylor

It is certified that error appears in the above-identified patent and that said Letters Patent is hereby corrected as shown below:

Column 4, line 65, delete [23] and insert therefor --223--;

Column 4, line 67, delete [23] and insert therefor --323--;

Column 5, line 25, after "in the range of" and before "microns in diameter" delted [500-200] and insert therefor -- 50-200 --;

Column 6, line 31, after "they exit from said" and before "after being dried" delted [fryer] and insert therefor --dryer--.

Signed and Sealed this

Ninth Day of November, 1993

Attest:

BRUCE LEHMAN

*Attesting Officer*  *Commissioner of Patents and Trademarks*